Dec. 19, 1950 E. E. BRAY 2,534,657
MONOCHROMATOR

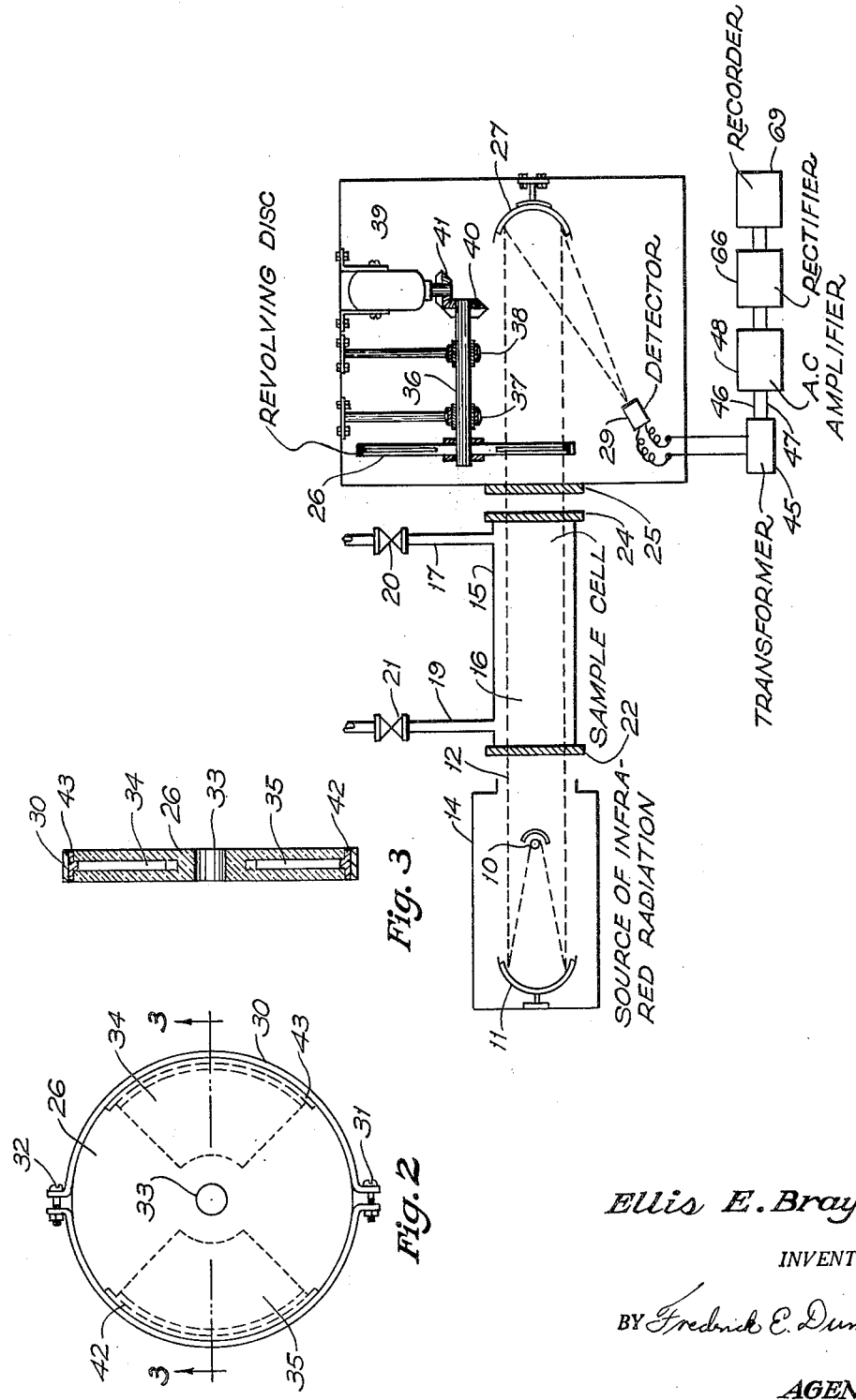

Filed Aug. 7, 1948 2 Sheets-Sheet 2

*Ellis E. Bray*
INVENTOR.

BY *Frederick E. Dumoulin*

AGENT

Patented Dec. 19, 1950

2,534,657

UNITED STATES PATENT OFFICE 2,534,657

MONOCHROMATOR

Ellis E. Bray, Cedar Hill, Tex., assignor, by mesne assignments, to Socony-Vacuum Oil Company, Incorporated, New York, N. Y., a corporation of New York Application August 7, 1948, Serial No. 43,051

9 Claims. (Cl. 250—83)

This invention relates to the absorption of radiant energy of selected wave lengths and relates more particularly to a monochromator for determining the presence and concentration of materials capable of selectively absorbing infrared radiation.

It is known that certain materials are capable of absorbing particular wave lengths of radiant energy and this property of the materials has been utilized to detect their presence or their concentration in gases, liquids, or solids. Thus, for example, the presence of hydrocarbons or the concentration of hydrocarbons in a gas sample may be determined by passing a beam of infrared radiation through the sample and determining the extent of absorption of those wave lengths which are absorbed by hydrocarbons. The extent of absorption will be a measure of the presence or concentration of hydrocarbons in the sample and, by comparison of the extent of absorption by the sample with the extent of absorption by reference samples containing known quantities of hydrocarbons, the concentration of hydrocarbons can be quantitatively determined. By the use of a monochromator, i. e., a device which will screen out undesired wave lengths or undesired bands of wave lengths and provide abundant energy in the desired wave lengths, a more sensitive and more accurate determination of the material in the sample can be made.

It is an object of this invention to provide a method for analyzing for materials by absorption of infrared radiation. It is another object of this invention to provide a monochromator. It is another object of this invention to provide a monochromator of simple construction which will provide abundant energy. It is another object of this invention to provide a more sensitive and more accurate method for determining the presence or concentration of materials which selectively absorb infrared radiation. These and other objects of the invention will become apparent from the following description thereof.

In accordance with the invention, a method and apparatus are provided wherein infrared radiation from a suitable source is directed through a sample and upon a detector responsive to rapid changes in intensity of the infrared radiation, and a portion of material having the same absorption characteristics as the material whose presence or concentration in the sample is to be determined is alternately placed into and removed from the optical path of the infrared radiation at a desired frequency. The radiant energy striking the detector is converted to electrical energy producing an alternating current superimposed on a direct current, the alternating current being a function of the amount of material in the sample whose presence or concentration is to be determined. The direct current is filtered from the alternating current and the alternating current is measured as indicative of the presence or concentration of the material in the sample for which analysis is made. Conveniently, the material alternately placed into and removed from the path of the radiant energy may be the same kind of material whose presence or concentration in the sample is to be determined.

Assuming that the sample does not contain a constituent or constituents capable of absorbing any of the wave lengths of the infrared radiation, the infrared radiation striking the detector after passing through only the sample will be at a maximum. However, when the portion of material having the same absorption charactertistics as the material whose presence or concentration in the sample is to be determined is placed into the optical path of the infrared radiation, some of the wave lengths of the infrared radiation will be absorbed and the energy striking the detector will be at a minimum. Accordingly, the radiant energy striking the detector will alternately be at a maximum and a minimum as the portion of material having the same absorption characteristics as the material whose presence or concentration in the sample is to be determined is placed into and removed from the path of the infrared radiation. By converting the infrared radiation striking the detector into electrical energy, a fluctuating current will be produced which will consist of an alternating current superimposed on a direct current. By filtering the direct current, an alternating current will be produced whose frequency will be the same as the frequency with which the portion of material is placed into and removed from the path of the infrared radiation, and whose amplitude will depend upon the amount of infrared radiation absorbed by this portion of material and the extent of amplification, if any. When the sample contains a constituent or constituents capable of absorbing infrared radiation and which have the same absorption characteristics as those of the portion of material alternately placed into and removed from the path of the infrared radiation, the energy passing through only the sample will have decreased from its previous maximum. However, in this case, the energy passing through both the sample and the material alternately placed into the path of the infrared radiation will remain at its previous minimum since this energy is the energy which is not absorbable by the sample or material. Accordingly, the amplitude of the alternating current will decrease and the decrease will be proportional to the amount of radiant energy absorbed by the sample. By suitable calibration with samples containing a known constituent or constituents in known concentration, the decrease in the amplitude of the alternating current will be a quantitative measure of the sought-for constituent or constituents in the sample. If desired, the alternating current can be rectified to a direct current, and the decrease in the value of the direct current will be a quantitative measure of the sought-for constituent or constituents in the sample.

It is not necessary to filter the entire direct current component from the fluctuating current.

It is only necessary to filter a substantial portion of the direct current component, i. e., sufficient of the direct current component so that the direct current component does not interfere with the measurement of the alternating current component. However, it is preferred to filter the entire direct current component.

The process and apparatus of the invention may be employed for determining the presence or concentration of any type of material that will selectively absorb particular wave lengths of infrared radiation. The materials which will selectively absorb particular wave lengths of infrared radiation are well known to those skilled in the art and their presence and concentration have been determined by other methods involving absorption of infrared radiation. However, by way of example, it may be mentioned that the present invention can be employed for determining the presence and concentration of hydrocarbons in the atmosphere, in soil gases or other gases, and in liquids, or for determining the presence and concentration of carbon tetrachloride in various gases or liquids. Thus, in geochemical prospecting methods for the detection of petroleum reservoirs, soil gases may be analyzed for hydrocarbons by the present invention. Further, analysis may be made of atmospheres possibly contaminated with hydrocarbons, carbon tetrachloride, or other poisonous vapors which create occupational hazards for workmen or others who might breathe the vapors.

The invention will be described in greater detail in conjunction with the drawings in which:

Figure 1 is a semi-diagrammatic representation of one embodiment of the invention;

Figure 2 is a front elevation of a revolving disk for alternately placing into and removing from the path of the infrared radiation the portion of material having the same absorption characteristics as the material whose presence or concentration in the sample is to be determined;

Figure 3 is a cross section through the line 3—3 of the revolving disk;

Figure 4:
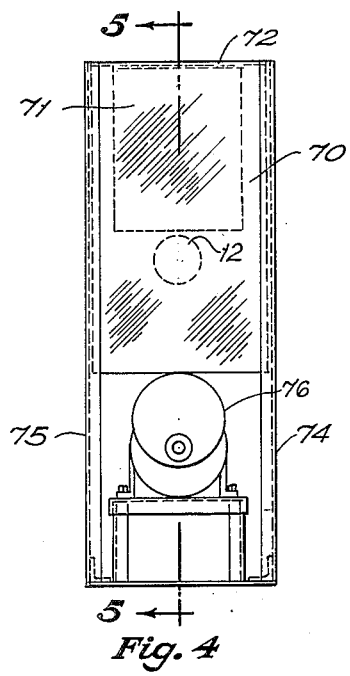
Figure 4 is a front elevation of an oscillator for alternately placing into and removing from the path of the infrared radiation the portion of material having the same absorption characteristics as the material whose presence or concentration in the sample is to be determined.

Referring now to Figure 1, infrared radiation from a suitable source 10, such as a Nernst lamp, is directed upon mirror 11 which may be a gold sputtered mirror, from whence it is reflected as a parallel beam 12, from the housing 14, through sample cell 15. Sample cell 15 may be of any suitable design and, as shown, consists of a chamber 16 having an inlet line 17 and an outlet line 19 provided with valves 20 and 21, respectively. If desired, a multiple path sample cell may be employed, particularly where the concentration of the sought-for constituent in the sample cell is low. The sample cell may be used for single, individual samples of the material to be tested or may be used for continuous analysis by passing the material to be analyzed continuously through the cell. Continuous analysis will be employed where variations in the composition of a gas or liquid over a prolonged period of time are to be ascertained. For solid samples, the cell need not be used but the solid placed in the path of the beam 12. Windows 22 and 24, constructed of a material transparent to the wave lengths which are absorbable by the material for which analysis is being made, are provided at both ends of the sample tube. Suitable materials of construction for the windows which are transparent to wave lengths of infrared radiation absorbable by carbon tetrachloride are sodium chloride and silver chloride. Where other organic compounds are to be detected, the windows may be made from lithium fluoride, sodium chloride, silver chloride, or quartz.

The beam of radiation passes through window 25, which is made of the same type of material as windows 22 and 24, and through revolving disk 26. From the disk, the beam passes to mirror 27 and is directed to detector 29 which converts the infrared radiation to electrical energy. Any type of detector responsive to small and rapid changes in intensity of the infrared radiation will be satisfactory. A thermocouple may be employed, such as a bismuth and antimony thermocouple made by condensing vaporized bismuth and vaporized antimony on a suitably thin, non-conducting support. Other types of detectors such as bolometers may also be employed.

As shown in Figures 2 and 3, disk 26 is circular in shape. The disk is constructed of a material which is transparent to the wave lengths of infrared radiation absorbable by the material to be detected in the sample. The same type of materials may be employed for constructing the disk as are employed for constructing the windows 22, 24 and 25. The disk is provided at its periphery with a metal band 30 in order to provide additional mechanical strength for high speed operation, if such operation is desired, and the band is held in place on the disk by means of clamping bolts 31 and 32. A hole 33 is provided at the center of the disk for a shaft to revolve the disk. Chambers 34 and 35, to contain a portion of the material having the same absorption characteristics as the material whose presence or concentration in the sample in the cell 15 is to be determined, are provided in the disk and these may be provided by hollowing out the disk by drilling inwardly from the periphery.

The thickness of the chambers, i. e., the distance over which the beam 12 of the infrared radiation must travel through the chambers, will vary for particular cases depending upon the type and concentration of material to be placed in the chambers, which in turn will depend upon the type and concentration of material in the sample in cell 15. The proper thickness of the chambers is best determined by empirical tests. However, as a general rule, it is best to employ thin chambers or low concentrations, in order to obtain sharp resolution, since thick chambers or high concentrations broaden the wave lengths that are absorbed with the result that wave lengths are absorbed in the chambers which would not be absorbed in the sample. It is not necessary that the chambers be sufficiently thick or the concentration of the material be sufficiently high to absorb all the energy in the absorbable wave lengths. It is only necessary that at least a portion of some of the wave lengths be absorbed. However, it is preferred to absorb all the energy in the absorbable wave lengths in order to obtain a more sensitive measurement. The chambers should be sufficiently wide to cover the entire cross section of the beam 12.

The disk is revolved by shaft 36 supported by bearings 37 and 38 and torque is applied to the shaft from motor 39 through gears 40 and 41. Motor 39 is preferably a synchronous motor whereby a constant, desired rate of revolution of disk 26 may be obtained.

In operation, band 30 is removed from disk 26 and a portion of the material for which analysis is to be made is placed in the chambers 34 and 35. For example, if the sample is to be analyzed for carbon tetrachloride, the chambers may be filled with liquid carbon tetrachloride. The material is maintained in the chambers by means of gaskets 42 and 43 fitting into the chambers and extending laterally between the disk and the band 30. The band is replaced on the disk, the motor started, and the source of radiation 10 turned on. The disk revolving in the beam 12 presents to the beam at one moment one of the chambers and at the next moment the body portion of the disk. As the beam passes through the chambers, the material in the chambers selectively absorbs some of the wave lengths and thereby decreases the intensity of the radiation striking the detector and consequently the electrical energy produced by the detector. As the body portion of the disk is presented to the beam, these wave lengths are no longer absorbed and the full intensity of the beam strikes the detector with consequent full production of electrical energy. Thus, as the disk continues to revolve, the detector produces a fluctuating current.

The fluctuating current produced by the detector will have a direct current component and an alternating current component as previously mentioned. The direct current component will be a background current and will be due to those wave lengths of the infrared radiation which are not absorbed by the material in the chambers of the disk. Further, this background direct current will remain constant since those wave lengths of the infrared radiation which are not absorbed by the material in the chambers of the disk or by the sample will be attenuated to an insignificant extent, if at all, by the movement of the material in the chambers into and from the path of the infrared radiation. The alternating component will be due to those wave lengths of the infrared radiation which are absorbed by the material in the chambers.

The current passes from the detector to the primary 44 of transformer 45. Since the transformer is responsive only to the fluctuating current, the current produced from the secondary of transformer 45 will be representative only of the fluctuating current produced by the detector. The background direct current, due to the unabsorbed radiation passing through the chambers will be filtered out by the transformer. The current from transformer 45 passes through lines 46 and 47 and is amplified by the amplifier system 48 consisting of pentode 49, condenser 50, and batteries or power supplies 51, 52, 54 and 55. The amplified current then passes through lines 56 and 57 to the primary 59 of transformer 60. One stage of amplification is illustrated. However, if desired, further stages of amplification may be provided by passing the current from lines 56 and 57 to another pentode, in the same manner as to pentode 49, in a similar amplifier system and repeating this process for the desired number of times. The current from transformer 60 passes through lines 61 and 62 to leads 64 and 65. The alternating current in lines 61 and 62 is rectified by rectifier 66 consisting of diode 67 in line 62. By means of the diode, half wave rectification is obtained. However, if desired, full wave rectification may be obtained by using any conventional apparatus for the purpose. Leads 64 and 65 go to recorder 69 which may be any conventional type of instrument for quantitatively measuring and recording the electrical current from leads 64 and 65. If desired, an instrument which quantitatively measures but does not make a permanent record, such as a galvanometer, may be substituted for recorder 69.

A steady state current and consequently a steady state reading will be established almost immediately at recorder 69. The sample cell containing the sample is then placed in the beam 12, or, if the sample cell while empty has been in the path of the beam during the establishment of the steady state reading, the sample is placed in the cell, and the reading at recorder 69 noted. If the sample does not contain any of the sought-for material, the reading at recorder 69 will not change since there will be no change in the amounts of infrared radiation striking the detector 29. However, if the sample contains the sought-for material, some of the wave lengths of the infrared radiation will be absorbed and therefore the energy striking the detector when the body portion of the revolving disk is in the path of the beam will be decreased. On the other hand, since the wave lengths absorbed by the sample are the same as those absorbed by the material in the chambers, the infrared radiation striking the detector when the chambers are in the path of the beam will not be decreased. Consequently, the effect of the presence of sought-for material in the sample will be to decrease the extent of difference in the amount of infrared radiation striking the detector when the body portion and when the chambers of the disk are in the path of the beam. As a result, there will be a decrease in the current reaching the recorder and a decrease in the reading on the recorder. Thus, a decrease in the reading on the recorder will be indicative of the presence of the sought-for constituent in the sample and the extent of the decrease in the reading on the recorder will be a measure of the concentration of the sought-for constituent in the sample. By employing samples of known concentration in the sample tube and noting the decrease in current, comparison can be made with the decrease in current obtained with unknown samples whereby quantitative determinations of the concentration in the unknowns are obtained.

A revolving disk containing two chambers has been described above for alternately placing into and withdrawing from the beam of infrared radiation a portion of material having the same absorption characteristics as the material for which analysis of the sample is made. However, the disk may contain more than two chambers whereby a greater frequency of the alternating current produced by detector 29 may be obtained for the same rate of rotation of the disk. Also, the disk may contain one chamber, since only one chamber is necessary.

Figure 5:
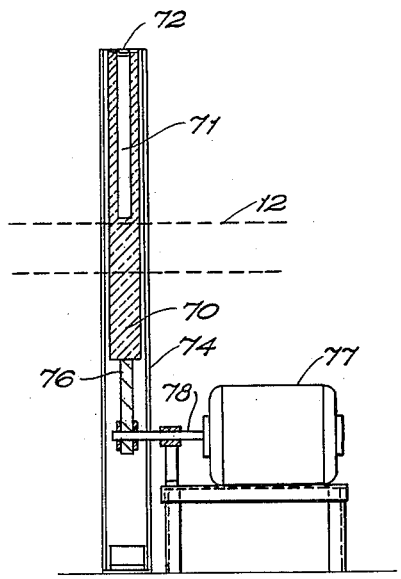
Figure 5 is a cross section through the line 5—5 of the oscillator.
Figure 6:
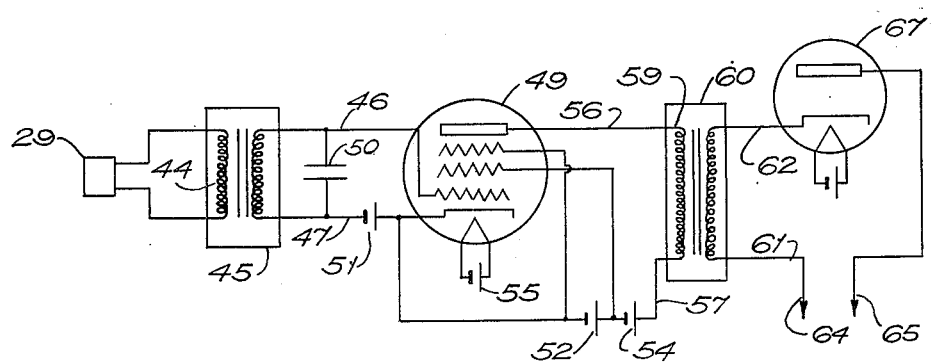
Figure 6 is a circuit diagram of the detector, amplifier, and rectifier system.

Various other types of apparatus may be employed for alternately placing into and withdrawing from the beam of infrared radiation a portion of material having the same absorption characteristics as the material for which analysis is made. For example, as shown in Figures 4 and 5, a rectangular oscillating plate may be employed. The plate 70 may be made of the same materials as revolving disk 26 and contains a chamber 71 hollowed from the plate for holding a portion of the material having the same absorption characteristics as the material for which analysis in the sample is being made, the material being kept in the chamber by means of cover 72. The plate oscillates perpendicularly within the guide plates 74 and 75 and is actuated by cam wheel 76 operated by synchronous motor 77 through shaft 78. If desired, the plate 70 may contain a plurality of chambers arranged perpendicularly to one another whereby a greater frequency of the alternating current produced by detector 29 may be obtained for the same frequency of oscillation of the plate 70.

The rate of revolution of the disk 26 or rate of oscillation of the plate 70 should be such as to produce a frequency of the current from detector 29 sufficiently high to be substantially unaffected by any momentary fluctuations arising from extraneous causes. A frequency of ten to twenty cycles per second is satisfactory. Where twenty cycles per second are desired, for example, the rate of revolution of the disk 26 containing two chambers will be 600 revolutions per minute. However, any frequency to which the detector and the transformer 45 will be responsive subject to the above mentioned limitation concerning momentary fluctuations, will be satisfactory.

Instead of placing the material having the same absorption characteristics as the material whose presence in the sample is to be detected in the chambers of disk 26 or plate 70, it is possible in some cases to paint or otherwise deposit the material on the outer surface of the disk or plate. This may be done, for example, where the material is plastic or resinous in nature, or is a solid, and will be retained on the surface of the disk or plate. Particularly, for example, where the material to be detected is a hydrocarbon, a viscous or resinous hydrocarbon polymer may be deposited on the disk or plate.

The apparatus hereinabove described may be further modified by positioning the sample cell in the optical path of the infrared radiation after the infrared radiation has passed through the disk 26 or plate 70. A further modification apparent to those skilled in the art will be the substitution for the transformer 45 of other means for filtering the direct current component from the current produced by detector 29. For example, the direct current may be filtered by placing a proper bias on the grids of pentode 49, assuming the transformer 45 was not used. Other conventional types of filtering means will be equally satisfactory.

Having thus described my invention, it will be understood that such description has been given by way of illustration and example only and not by way of limitation, reference for the latter purpose being had to the appended claims.

I claim:

1. A process for the analysis of a material capable of selectively absorbing wave lengths of infrared radiation comprising projecting a beam of infrared radiation through a sample of said material, alternately placing into and removing from said beam of infrared radiation at a predetermined frequency a portion of a material having the same infrared radiation absorption characteristics as the component of said sample of material for which analysis is being made, converting said infrared radiation to electrical energy, filtering direct current component from said electrical energy, and measuring alternating current component of said electrical energy.

2. A process for the analysis of a material capable of selectively absorbing wave lengths of infrared radiation comprising projecting a beam of infrared radiation through a sample of said material, alternately placing into and removing from said beam of infrared radiation at a predetermined frequency a portion of the same type of material capable of selectively absorbing wave lengths of infrared radiation for which analysis of said sample of material is being made, converting said infrared radiation to electrical energy, filtering direct current component from said electrical energy, and measuring alternating current component of said electrical energy.

3. A process for the analysis of a material capable of selectively absorbing wave lengths of infrared radiation for a hydrocarbon component thereof comprising projecting a beam of infrared radiation through a sample of said material, alternately placing into and removing from said beam of infrared radiation at a predetermined frequency a portion of a hydrocarbon of the same type as the hydrocarbon component for which analysis of the sample of material is being made, converting said infrared radiation to electrical energy, filtering direct current component from said electrical energy, and measuring alternating current component of said electrical energy.

4. Apparatus of the character described comprising in combination an emitter for infrared radiation, a detector in the optical path of said emitter capable of converting infrared radiation to electrical energy, a holder having a chamber therein adapted to contain a material capable of selectively absorbing at least a portion but not all of the wave lengths of infrared radiation produced by said emitter, said holder being constructed of a material transparent to wave lengths of infrared radiation absorbable by material to be placed in said chamber, means for alternately placing said holder into and removing said holder from the optical path between said emitter and said detector at a predetermined frequency, means for filtering direct current component from electrical energy produced by said detector, and means for measuring alternating current component of said electrical energy.

5. Apparatus of the character described comprising in combination an emitter for infrared radiation, a detector in the optical path of said emitter capable of converting infrared radiation to electrical energy, a holder having a chamber therein, a material in said chamber capable of selectively absorbing at least a portion but not all of the wave lengths of infrared radiation producible by said emitter, said holder being constructed of a material transparent to wave lengths of infrared radiation absorbable by said material in said chamber, means for alternately placing said holder into and removing said holder from the optical path between said emitter and said detector at a predetermined frequency, means for filtering direct current component from electrical energy produced by said detector, and means for measuring alternating current component of said electrical energy.

6. Apparatus for the analysis of a material capable of selectively absorbing wave lengths of infrared radiation comprising in combination an emitter for infrared radiation, a detector in the optical path of said emitter capable of converting infrared radiation to electrical energy, a sample cell for said material for which analysis is to be made positioned in the optical path between said emitter and said detector, said sample cell being transparent to wave lengths of infrared radiation absorbable by said material for which analysis is to be made, means comprising a holder for alternately placing into and removing from the optical path between said emitter and said detector at a predetermined frequency a material capable of selectively absorbing wave lengths of infrared radiation absorbable by a component of the material for which analysis is to be made but not all of the wave lengths of infrared radiation producible by said emitter, means for filtering direct current component from electrical energy produced by said detector, and means for measuring alternating current component of said electrical energy.

7. Apparatus for the analysis of a material capable of selectively absorbing wave lengths of infrared radiation comprising in combination an emitter for infrared radiation, a detector in the optical path of said emitter capable of converting infrared radiation to electrical energy, a sample cell for said material for which analysis is to be made positioned in the optical path between said emitter and said detector, said sample cell being transparent to wave lengths of infrared radiation absorbable by said material for which analysis is to be made, a disk transparent to wave lengths of infrared radiation absorbable by said material for which analysis is to be made positioned in the optical path between said emitter and said detector, a chamber in said disk containing a material capable of selectively absorbing wave lengths of infrared radiation absorbable by a component of the material for which analysis is to be made but not all of the wave lengths of infrared radiation producible by said emitter, means for rotating said disk whereby said chamber may be alternately placed into and removed from the optical path of said emitter at a predetermined frequency, means for filtering direct current component from electrical energy produced by said detector, and means for measuring alternating current component of said electrical energy.

8. Apparatus for the analysis of a material capable of selectively absorbing wave lengths of infrared radiation comprising in combination an emitter for infrared radiation, a detector in the optical path of said emitter capable of converting infrared radiation to electrical energy, a sample cell for said material for which analysis is to be made positioned in the optical path between said emitter and said detector, said sample cell being transparent to wave lengths of infrared radiation absorbable by said material for which analysis is to be made, a plate transparent to wave lengths of infrared radiation absorbable by said material for which analysis is to be made positioned in the optical path between said emitter and said detector, a chamber in said plate containing a material capable of selectively absorbing wave lengths of infrared radiation absorbable by a component of the material for which analysis is to be made but not all of the wave lengths of infrared radiation producible by said emitter, means for oscillating said plate whereby said chamber may be alternately placed into and removed from the optical path of said emitter at a predetermined frequency, means for filtering direct current component from electrical energy produced by said detector, and means for measuring alternating current component of said electrical energy.

9. A process for the analysis of a material capable of selectively absorbing wave lengths of infrared radiation for a hydrocarbon component thereof comprising projecting a beam of infrared radiation through a sample of said material, alternately placing into and removing from said beam of infrared radiation at a predetermined frequency a portion of a material having the same infrared radiation absorption characteristics as the hydrocarbon component of said sample of material for which analysis is being made, converting said infrared radiation to electrical energy, filtering direct current component from said electrical energy, and measuring alternating current component of said electrical energy.

ELLIS E. BRAY.

REFERENCES CITED

The following references are of record in the file of this patent:

UNITED STATES PATENTS

| Number | Name | Date |
|---|---|---|
| 1,963,185 | Wilson | June 19, 1934 |
| 2,068,476 | Thomas | Jan. 19, 1937 |
| 2,269,674 | Liddel et al. | Jan. 13, 1942 |
| 2,431,019 | Barnes | Nov. 18, 1947 |
| 2,451,572 | Moore | Oct. 19, 1948 |